United States Patent [19]

Guidoni et al.

[11] Patent Number: 5,098,356

[45] Date of Patent: Mar. 24, 1992

[54] MULTI-STAGE TORQUE PROPORTIONING DIFFERENTIAL

[75] Inventors: Sandro Guidoni, Rousies, France; Mark S. Brewer, North Chili, N.Y.

[73] Assignee: Zexel-Gleason U.S.A., Inc., Rochester, N.Y.

[21] Appl. No.: 712,667

[22] Filed: Jun. 10, 1991

[51] Int. Cl.$^5$ ............................................. F16H 1/44
[52] U.S. Cl. ...................................... 475/227; 475/249
[58] Field of Search ............................. 475/227, 249

[56] References Cited

U.S. PATENT DOCUMENTS

| | | | |
|---|---|---|---|
| 2,000,223 | 5/1935 | DuPras | 74/313 |
| 2,269,734 | 1/1942 | Powell | 74/312 |
| 2,397,673 | 4/1946 | Lewis | 180/22 |
| 2,462,000 | 2/1949 | Randall | 74/715 |
| 2,859,641 | 11/1958 | Gleasman | 74/715 |
| 2,900,846 | 8/1959 | Lehman | 74/714 |
| 2,932,218 | 4/1960 | Russell | 74/711 |
| 2,971,404 | 2/1961 | Thornton | 74/711 |
| 3,027,781 | 4/1962 | O'Brien | 74/711 |
| 3,053,114 | 9/1962 | Singer | 74/711 |
| 3,095,761 | 7/1963 | Hilado | 74/715 |
| 3,264,900 | 8/1966 | Hartupee | 74/711 |
| 3,331,262 | 7/1967 | Mazziotti | 74/711 |
| 3,362,258 | 1/1968 | Thornton | 74/711 |
| 3,706,239 | 12/1972 | Myers | 74/715 |
| 3,738,192 | 6/1973 | Belansky | 74/711 |
| 3,837,236 | 9/1974 | Kagata | 74/711 |
| 3,906,812 | 9/1975 | Kagata | 74/711 |
| 4,123,951 | 11/1978 | Kagata | 74/711 |
| 4,191,071 | 3/1980 | Gleasman et al. | 74/715 |
| 4,535,651 | 8/1985 | Chambers | 74/711 |
| 4,805,487 | 2/1989 | Pedersen | 74/715 |
| 4,890,511 | 1/1990 | Pedersen | 74/715 |
| 4,926,711 | 5/1990 | Arakawa | 475/227 |

FOREIGN PATENT DOCUMENTS 3927071  3/1990  Fed. Rep. of Germany .

OTHER PUBLICATIONS

U.S. Patent Application, Ser. No. 602,735, "Differential with Varied Frictional Surfaces," Filing Date: 10/24/90.

Primary Examiner—Leslie A. Braun
Assistant Examiner—William O. Trousdell
Attorney, Agent, or Firm—Eugene Stephens & Associates

[57] ABSTRACT

A torque proportioning differential (10, 60, or 120) is modified to exhibit a bias ratio that varies with torque transmitted by the differential. Thrust forces (34 and 36, 88 and 90, or 144 and 146) generated within the differential are opposed by at least one pair of surfaces (38 and 40, 96, 98 and 104, 106, or 152, 154 and 156, 158) having different frictional characteristics. One of the surfaces (38, 96 and 98, or 152 and 154) opposes a portion of the thrust forces, and the other surface (40, 104 and 106, or 156 and 158) opposes a remaining portion of the thrust forces. A control member (54, 100 and 102, or 152) responsive to the transmitted torque limits the respective portions of the thrust forces opposed by each of the two surfaces.

21 Claims, 4 Drawing Sheets

MULTI-STAGE TORQUE PROPORTIONING DIFFERENTIAL

FIELD OF INVENTION

The invention relates to the field of differentials used in automotive drive lines to divide engine power between two drive shafts and, in particular, to such differentials that also develop resistance to relative rotation between the two shafts as a function of torque transmitted to them by the differential.

BACKGROUND

Torque proportioning differentials develop a frictional resistance to differentiation between two interconnected drive shafts substantially proportional to a sum of torques transmitted to the drive shafts. During periods of differentiation, the resistance is apparent as a torque difference between the relatively rotating drive shafts. The torque difference varies linearly with the sum of the torques of the two drive shafts defining a substantially constant ratio that can be represented by a symbol "k" as follows:

$$k = \frac{T_d}{T_s}$$

where "$T_d$" is the torque difference between the drive shafts, and "$T_s$" is the torque sum of the two shafts. The symbol k is also a coefficient that represents a proportion of the torque sum $T_s$ that can be developed as a torque difference $T_d$. Thus, a linear equation for the torque difference $T_d$ can be written as follows:

$$T_d = k\, T_s.$$

However, this proportioning characteristic is more commonly expressed as another ratio, referred to as "bias ratio", which is a ratio of respective amounts of torque in the two drive shafts. More particularly, bias ratio represents a quotient of the amount of torque in one of the two relatively rotating drive shafts having more torque divided by the amount of torque in the other relatively rotating drive shaft having less torque. However, bias ratio can also be expressed in terms of the torque difference $T_d$ and torque sum $T_s$ of the drive shafts as follows:

$$B = \frac{1 + \frac{T_d}{T_s}}{1 - \frac{T_d}{T_s}}.$$

Accordingly, bias ratio "B" is also related to the ratio "k" of the torque difference to torque sum as follows:

$$B = \frac{1 + k}{1 - k}.$$

Although most torque proportioning differentials exhibit approximately constant bias ratios over normal ranges of torque transmissions to the drive shafts, some differentials exhibit a bias ratio that decreases with the amount of torque transmitted by the differential. One such example supplements the torque proportioning characteristic with a constant frictional resistance to differentiation, known as "preload", that is independent of the total amount of torque transmitted to the drive shafts. The differential includes a planetary bevel gear arrangement carried within a housing for interconnecting the drive shafts and a pair of friction clutches that are preloaded to provide a constant amount of frictional torque for opposing relative rotation between either drive shaft and the housing.

Torque is also transmitted between the differential housing and drive shafts by a pair of camming members. A shaft that mounts a pair of "spider" gears within the housing includes mating camming surfaces that separate the camming members as a function of the torque transmitted by the differential. The separating movement of the camming members further loads the friction clutches for opposing differential rotation of the drive shafts. Accordingly, the amount of frictional torque developed in opposition to differentiation is also a function of the torque transmitted by the differential.

Accounting for the preload as a constant frictional torque "$C_0$", the torque difference $T_d$ that is available to oppose differential rotation between drive shafts is expressed as the following linear equation:

$$T_d = C_0 + k_0\, T_s$$

where coefficient "$k_0$" is a proportion of the torque sum $T_s$ that is developed as frictional torque for resisting differentiation.

The bias ratio of this differential example is a function $B(T_s)$ of the torque sum transmitted to the drive shafts and is expressed in equation form as follows:

$$B(T_s) = \frac{1 + k_0 + \frac{C_0}{T_s}}{1 - k_0 - \frac{C_0}{T_s}}.$$

The calculated bias ratio $B(T_s)$ is most affected by the preload torque $C_0$ at torque sums $T_s$ that are less than the preload torque. In fact, the bias ratio approaches infinity at very low torque sums. However, the effect of the preload becomes negligible at high amounts of torque transmitted by the differential.

Although it is desirable in certain differential applications to provide an initially high bias ratio that decreases with increasing amounts of torque transmitted by the differential, frictional resistance to differentiation exceeding the amount of transmitted torque (i.e., $T_d > T_s$) is generally undesirable. The excessive frictional resistance at small amounts of transmitted torque acts as a brake that consumes power, produces unnecessary heat and wear within the differential, and can interfere with anti-lock braking systems.

Another way of varying bias ratio with torque transmitted to a pair of drive shafts is disclosed in U.S. Pat. No. 3,264,900 (HARTUPEE). Torque is transmitted between a differential housing and a conventional bevel gearing arrangement interconnecting the drive shafts by a pair of camming members that are carried within the housing. The camming members have specially contoured surfaces that engage mating spherical surfaces of a spider shaft at angles of friction that increase with increasing amounts of torque transmitted through the camming members. Engagements between the spider shaft and camming members produce separating forces against respective friction clutch assemblies that resist relative rotation between the drive shafts. Although the resistance to differentiation increases with the amount of torque transmitted by the camming members, the resistance decreases as a proportion of the transmitted torque in accordance with the increasing angles of friction on the camming members.

Thus, the proportion of the torque sum $T_s$ that is developed as a torque difference $T_d$ is a function $k(T_s)$ of the torque sum, yielding a torque difference $T_d$ that is expressed most generally by the following nonlinear equation:

$$T_d = k(T_s)T_s$$

and by appropriate substitution, the bias ratio can also be written in terms of the function $k(T_s)$ as follows:

$$B(T_s) = \frac{1 + k(T_s)}{1 - k(T_s)}.$$

Actually, the general function $k(T_s)$ is much broader than that required to support the more limited objective of reducing bias ratio with increasing total torque. Also, the torque proportioning effect of the camming surfaces is very sensitive to amounts of separation between the camming members required to engage the friction clutches. Small amounts of wear in the friction clutches or even ordinary tolerancing variations in the clutches could significantly affect amounts of torque difference supported between the drive shafts at particular amounts of total torque transmitted by the differential.

SUMMARY OF INVENTION

Our invention provides for varying bias ratio as a function of torque transmitted by a differential to a pair of drive shafts, while developing a torque resistance to differentiation that is no greater than a sum of the torques to both drive shafts. In other words, the variation of bias ratio with the torque sum can be accomplished without a preload or any other constant force acting to help resist differentiation. The variation in bias ratio with the torque transmitted to the output shafts is relatively insensitive to wear of differential components, and the variation can be controlled so that bias ratio either increases or decreases with increasing amounts of torque transmitted by the differential.

Our differential includes a housing rotatable about a pair of drive shafts and an operative connection between the drive shafts for permitting the drive shafts to rotate in opposite directions with respect to the housing. A component of the operative connection between the drive shafts imparts a thrust force that varies in magnitude with variations in torque transmitted between the housing and the drive shafts. A first frictional surface opposes at least a portion of the magnitude of the thrust force, and a second frictional surface opposes a remaining portion of the thrust force magnitude. A control member responsive to the transmitted torques limits engagement of the second frictional surface to opposing the remaining portion of the thrust force magnitude. The two frictional surfaces develop frictional resistances to relative rotation between the drive shafts in different proportions to their opposed portions of the thrust force magnitude.

Preferably, the thrust forces are produced by a conventional gearing arrangement interconnecting the drive shafts. The two frictional surfaces are gear-mounting surfaces that oppose the thrust force imparted by one or more of the gears in the arrangement. One of the two mounting surfaces is supported by a spring in a position that is offset in a direction for opposing the thrust force. The spring functions as the control member by preventing the other mounting surface from opposing the thrust force until the thrust force opposed by the one mounting surface is of sufficient magnitude to compress the spring through the offset distance. One of the two mounting surfaces has a higher coefficient of friction than the other, and the surface with the higher coefficient of friction is preferably effective for generating frictional torque at a larger radius than the lower coefficient of friction surface.

The result is a multi-stage torque proportioning differential that exhibits a first bias ratio up to a predetermined amount of torque transmitted to the drive shafts; and for transmitted torques over the predetermined amount, the differential exhibits a progressively varying bias ratio that approaches a second bias ratio at much larger amounts of transmitted torque. The second bias ratio may be greater than or less than the first bias ratio.

BEST MODES FOR CARRYING OUT THE INVENTION

Figure 1:
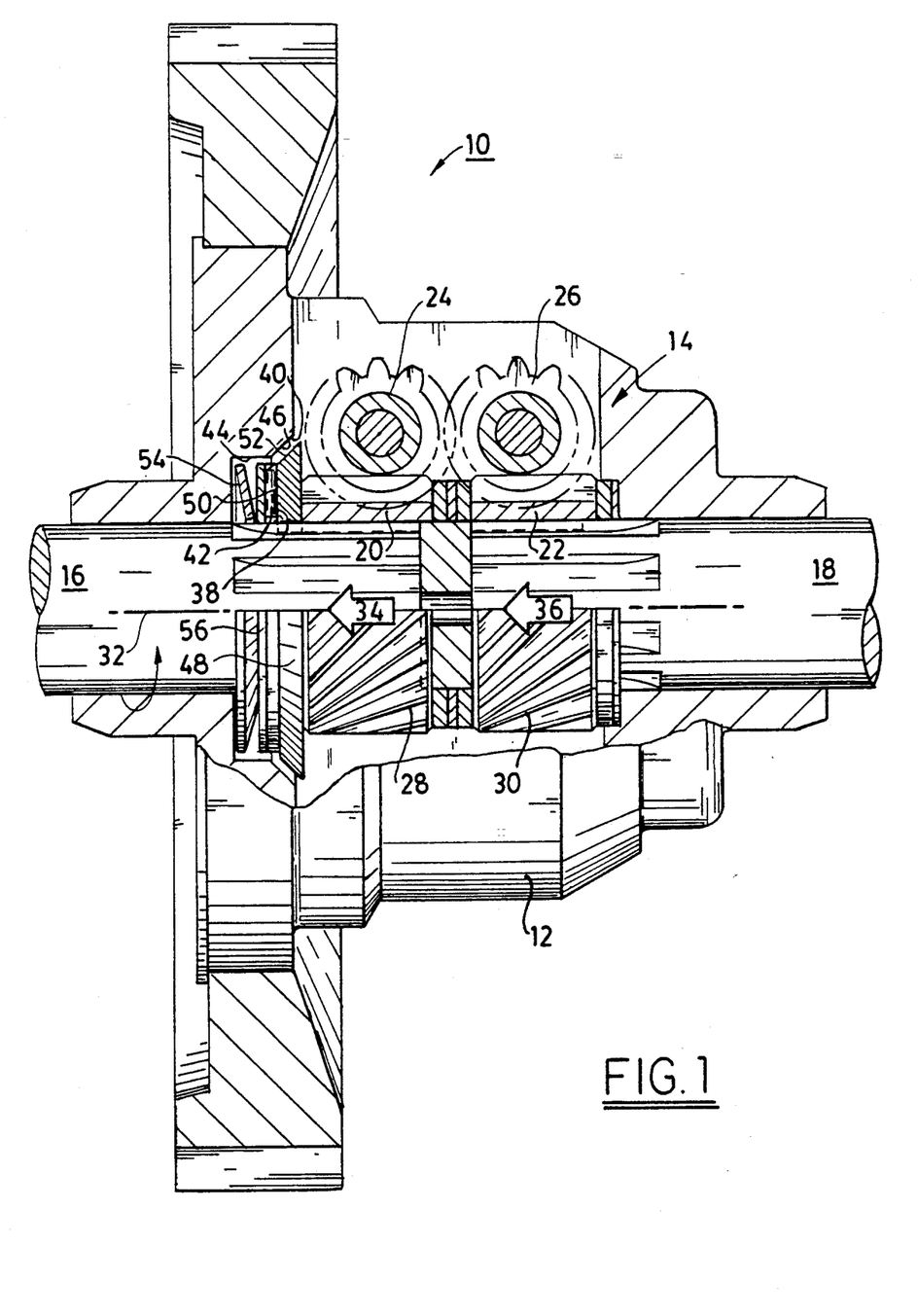
FIG. 1 is fragmentary cross-sectional view of a worm gear differential modified in accordance with our invention.

A first example (10) of our multi-stage torque proportioning differential is depicted in FIG. 1 as an improvement over a conventional worm gear differential. Carried within a housing 12 is a planetary worm gearing arrangement 14 interconnecting drive shafts 16 and 18 for opposite directions of rotation with respect to the housing 12. The gearing arrangement 14 includes a pair of side gears 20 and 22 coupled to respective drive shafts 16 and 18 and one or more pairs of element gears 24 and 26 that include respective portions for meshing with one of the side gears and for meshing with each other.

The side gears 20 and 22 have respective teeth 28 and 30 that are inclined in the same direction to their common axis of rotation 32 through the same "hand" helix angle (i.e., right hand or left hand). Respective thrust forces 34 and 36 are imparted by the side gears 20 and 22 in response to transmissions of torque from the differential housing 12 to the drive shafts 16 and 18. Magnitudes of the thrust forces are determined in part by the helix angles as proportions of the torque transmitted by the side gears. However, in contrast to conventional worm gear differentials that provide a single frictional mounting surface at one end of a housing for opposing side gear thrust forces, the modified differential 10 includes two different frictional mounting surfaces 38 and 40 for opposing different portions of a combined magnitude of the thrust forces 34 and 36.

The frictional surface 38 is formed by a bearing 42 that is mounted within a bore 44 at one end of the housing 14. The other frictional surface 40 is formed as a countersunk bore 46 surrounding the bore 44. The side gear 20 is coupled to a frusto-conical shaped washer 48 having an end surface 50 for engaging the bearing 42 and a peripheral surface 52 for engaging the countersunk bore 46. The bearing 42 is supported in the bore 44 by a disc spring 54 acting through a conventional washer 56.

The disc spring 54 urges the bearing 42 toward the conical washer 48 so that, with respect to movement of the conical washer 48 along the axis 32, the bearing 42 is positioned closer to the conical washer 48 than the countersunk bore 46. Accordingly, thrust forces 34 and 36, which are imparted by the respective side gears 20 and 22, are initially opposed by the bearing 42. However, the disc spring 54 supporting the bearing 42 compresses in proportion to the magnitude of the combined thrust forces exerted by the end face 50 of conical washer 48 until the peripheral surface 52 of the washer 48 contacts the countersunk bore 46.

The disc spring 54 is dimensioned so that the peripheral surface 52 of conical washer 48 contacts the countersunk bore 46 at a combined thrust force from the side gears corresponding to a predetermined amount of torque transmitted from the housing 12 to the drive shafts 16 and 18. The friction surface 38 formed by bearing 42 opposes a portion of the combined magnitude of the two thrust forces up to the predetermined amount while developing very little frictional torque opposing relative rotation between the conical washer 48 and housing 12. However, a remaining portion of the combined magnitude of the thrust forces exceeding the predetermined amount is opposed by the friction surface 40 formed by the countersunk bore 46. The friction surface 40 has a higher coefficient of friction than friction surface 38; acts at a larger radius than friction surface 38; and, in further contrast to the friction surface 38, is inclined to the thrust forces. Thus, the friction surface 40 develops a significant amount of additional frictional torque opposing relative rotation between the conical washer 48 and housing 12 in response to thrust forces having a combined magnitude that exceeds the predetermined amount.

Figure 2:
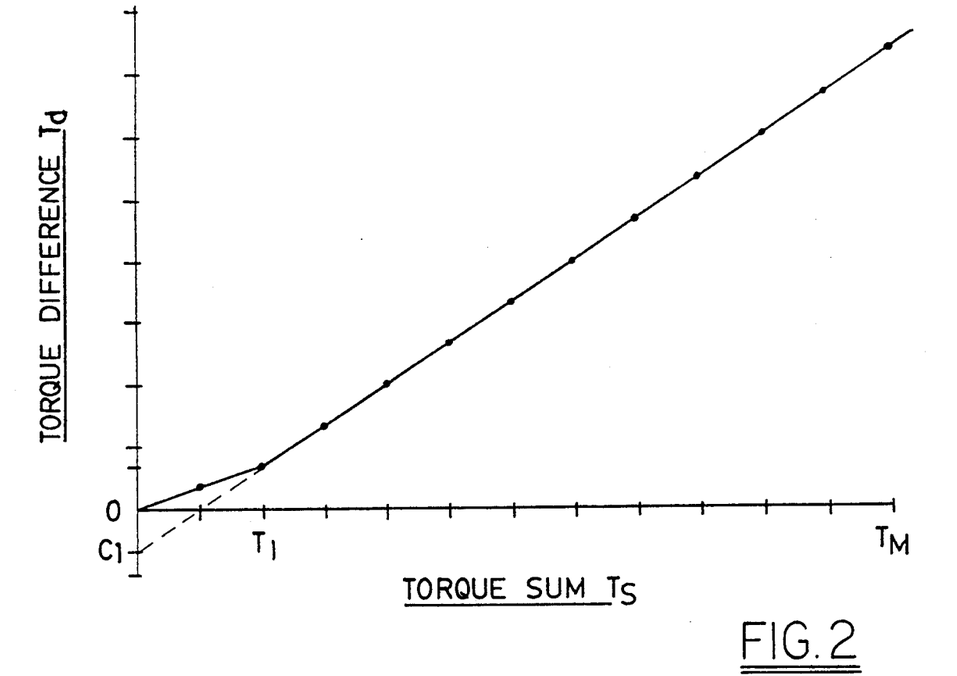
FIG. 2 is a graph showing torque difference between a pair of drive shafts interconnected by the modified worm gear differential plotted against torque sum of the two shafts for describing expected performance of the modified worm gear differential.

FIG. 2 plots a torque difference $T_d$ between relatively rotating drive shafts 16 and 18 as a function of a torque sum $T_s$ of both drive shafts in accordance with the expected performance of the just-described worm gear differential 10. The torque difference $T_d$ corresponds to the amount of frictional torque that is developed by all frictional surfaces within the differential in opposition to the relative rotation between drive shafts. The torque sum $T_s$ corresponds to the amount of torque transmitted from the differential housing 12 to the drive shafts 16 and 18.

The plot of torque difference $T_d$ is discontinuous at a value of the torque sum $T_s$ indicated along the abscissa at "$T_1$". The value represented by $T_1$ corresponds to the predetermined amount of torque transmitted from the housing to the drive axles at which the combined thrust forces 34 and 36 exerted by the respective side gears 20 and 22 overcome the disc spring 54 and engage the peripheral surface 52 of washer 48 with the countersunk bore 46. From "0" to $T_1$ along the abscissa, the torque difference is a linear function of the torque sum defined by a first slope "$k_1$". A second slope "$k_2$" in part defines a different linear function from $T_1$ to "$T_m$" (i.e., a very large torque sum). The two linear functions can be written as follows:

$$T_{d1} = k_1 T_s; \text{ for } T_s \leq T_1 \text{ and}$$

$$T_{d2} k_2 T_s - (k_2 - k_1) T_1; \text{ for } T_s > T_1.$$

Figure 3:
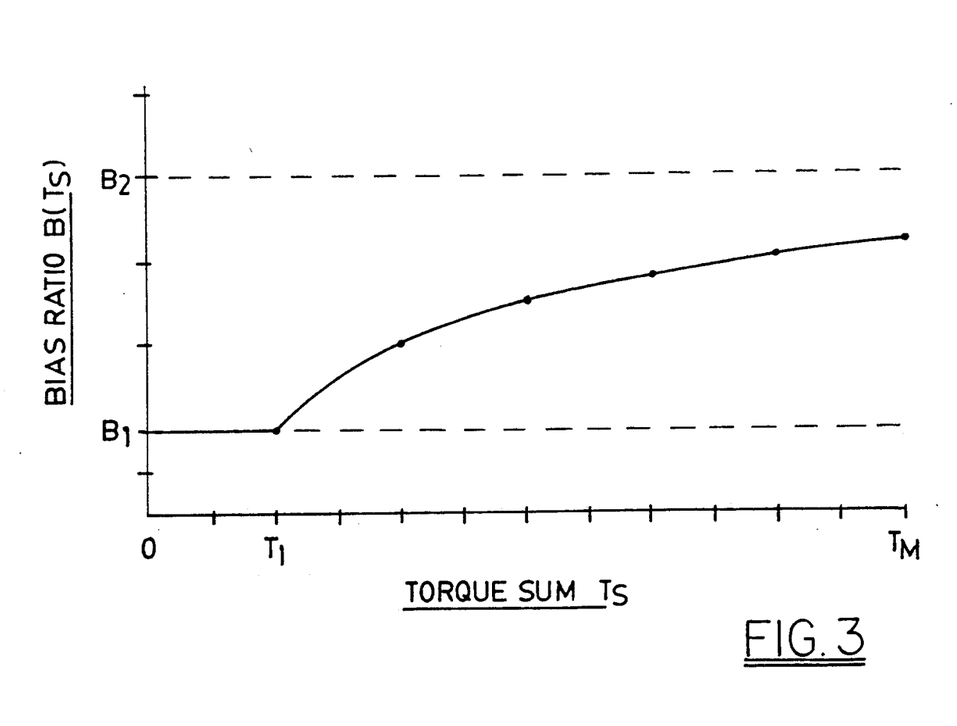
FIG. 3 is a graph plotting bias ratio against the same range of torque sum for describing another expected performance characteristic of the modified worm gear differential.

FIG. 3 plots bias ratio against the same ranges of torque sums. Values of the bias ratio are found from two different equations covering the same ranges as the two just-above linear functions for torque difference as follows:

$$B_1(T_s) = \frac{1 + k_1}{1 - k_1}; \text{ for } T_s \leq T_1 \text{ and}$$

$$B_2(T_s) = \frac{1 + k_2 + \frac{C_1}{T_s}}{1 - k_2 - \frac{C_1}{T_s}}; \text{ for } T_s > T_1$$

where "$C_1$" is a constant representing the expression "$(k_1 - k_2) T_1$" in the second linear function for torque difference.

Bias ratio remains at a constant first value "$B_1$" throughout a first range of torque sums less than the predetermined amount $T_1$. However, bias ratio varies considerably throughout a second range of torque sums exceeding the predetermined amount $T_1$ and approaches a second value "$B_2$" at much larger torque sums included within the second range. The values $B_1$ and $B_2$ are separately related to the respective proportions $k_1$ and $k_2$ in the manner shown below, which is the same manner as conventional bias ratios are calculated:

$$B_1 = \frac{1 + k_1}{1 - k_1} \text{ and}$$

$$B_2 = \frac{1 + k_2}{1 - k_2}.$$

The increase in bias ratio from the first value $B_1$ to the second value $B_2$ can be attributed to an increase in frictional torque generated by the frictional surface 40 formed by the countersunk bore 46 over the frictional torque generated by the frictional surface 38 formed by bearing 42.

Figure 4:
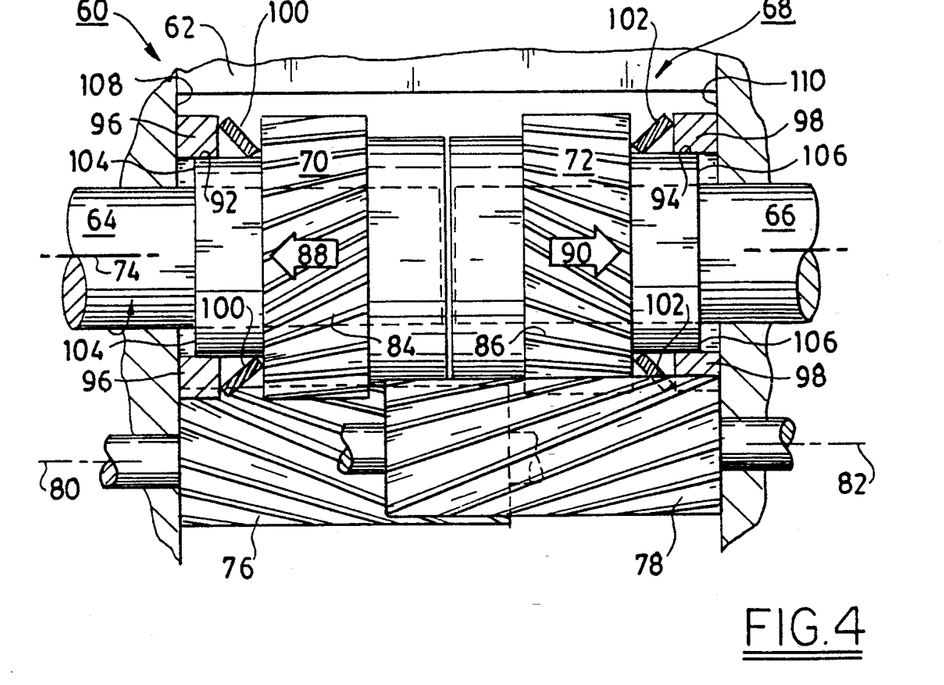
FIG. 4 is a fragmentary cross-sectional view of a helical gear differential that has also been modified in accordance with our invention.

FIG. 4 shows a second example of our multi-stage torque proportioning differential as an improvement over a conventional helical gear differential (sometimes referred to as a "spur gear differential"). The differential 60 includes a housing 62 rotatable about a pair of drive shafts 64 and 66. A planetary helical gear arrangement 68 carried within the housing 62 interconnects the drive shafts 64 and 66 for opposite directions of rotation with respect to the housing. Side gears 70 and 72 are coupled to the respective drive shafts 64 and 66 for rotation about a common axis 74. Pairs of element gears 76 and 78, which are mounted for rotation about respective axes 80 and 82 that are parallel to the common axis 74, mesh with the respective side gears 70 and 72 and with each other for operatively interconnecting the side gears.

In further contrast to the preceding example, the side gears 70 and 72 have respective teeth 84 and 86 that are inclined in opposite directions to the common axis 74. That is, the side gear teeth 84 and 86 have opposite hand helix angles. The opposite hand helix angles of the gear teeth 84 and 86 direct respective thrust forces 88 and 90 of the side gears 70 and 72 toward opposite ends of the housing 62 in response to transmissions of forward drive torque from the housing 62 to the drive shafts 64 and 66.

Similar arrangements of frictional surfaces are made at outer ends of the two side gears 70 and 72. For example, the outer ends of the two side gears are formed with respective journals 92 and 94 that support respective friction washers 96 and 98 for rotation with the side gears. Disc springs 101 and 102 urge the respective washers 96 and 98 apart from the side gears. The friction washers 96 and 98 are treated to exhibit a relatively high coefficient of friction. However, ends 104 and 106 of the respective journals 92 and 94 are treated to exhibit a relatively low coefficient of friction. For example, the friction surfaces of the washers 96 and 98 may be made from a bonded material of a type commonly used in clutches and brakes. The journal ends 104 and 106 may be coated with a friction-reducing material.

The disc springs 100 and 102 urge the friction washers 96 and 98 toward respective ends 108 and 110 of the housing 62, so that the friction washers 96 and 98 are positioned closer to the respective housing ends 108 and 110 than the journal ends 104 and 106. Accordingly, predetermined portions of the respective magnitudes of the oppositely directed thrust forces 88 and 90, which are imparted by the respective side gears 70 and 72, are opposed by the friction washers 96 and 98 bearing against the respective housing ends 108 and 110. However, the disc springs 100 and 102 supporting the respective friction washers 96 and 98 compress in proportion to the respective magnitudes of the thrust forces 88 and 90 opposed between the friction washers 96 and 98 and the housing ends 108 and 110. At predetermined magnitudes of the thrust forces, the ends 104 and 106 of the journals also contact the housing ends 108 and 110 for opposing further increases in the magnitudes of the thrust forces.

Preferably, both of the disc springs 100 and 102 are dimensioned so that the journal ends 104 and 106 contact the respective housing ends 108 and 110 at thrust forces having respective magnitudes corresponding to a predetermined amount of torque transmitted from the housing 62 to the drive shafts 64 and 66. The friction washers 96 and 98 develop a considerable amount of frictional torque for opposing relative rotation between the side gears throughout a first range of the transmitted torques up to the predetermined amount. However, the journal ends 104 and 106 develop a much smaller amount of additional frictional torque throughout a second range of transmitted torques above the predetermined amount.

Figure 5:
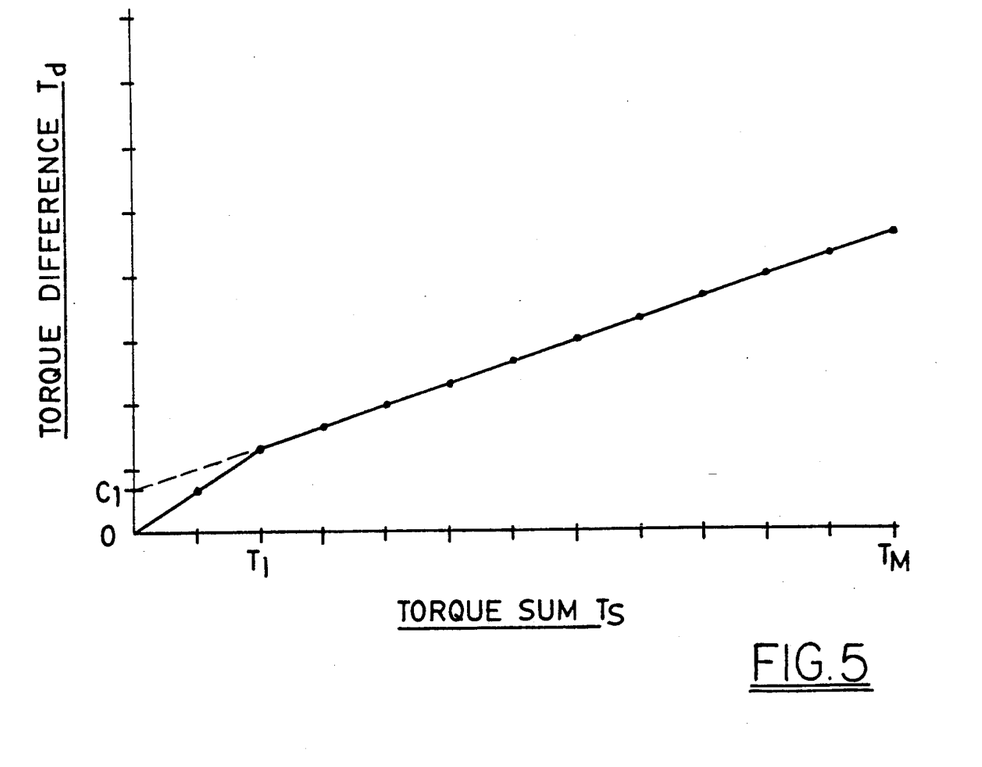
FIG. 5 is a graph showing torque difference plotted against torque sum for describing the expected performance of the modified helical gear differential.
Figure 6:
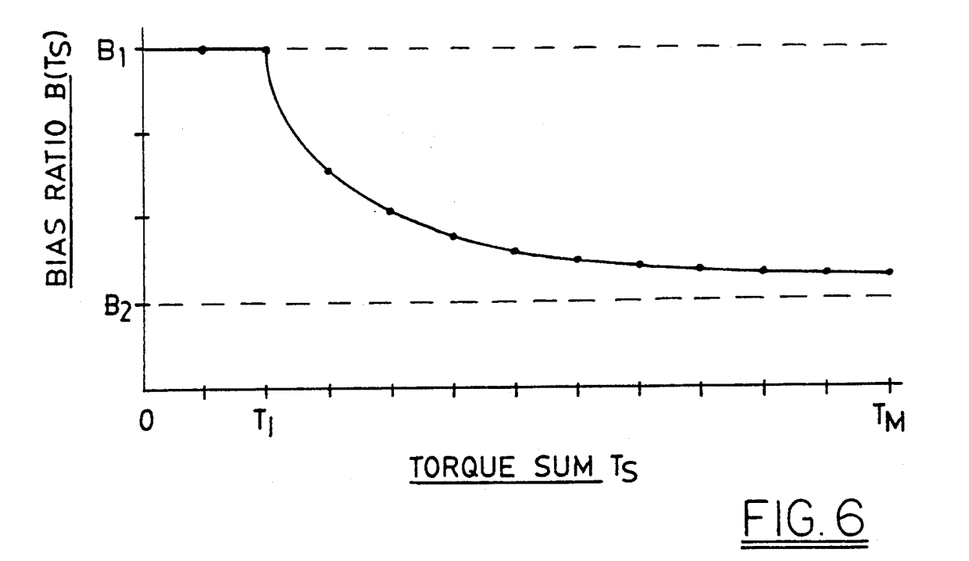
FIG. 6 is a graph plotting bias ratio against the same range of torque sum for describing another expected performance characteristic of the modified helical gear differential.

FIGS. 5 and 6 show respective performances of the differential 60 in measures of both torque difference $T_d$ and bias ratio $B(T_s)$ plotted against torque sum $T_s$. Similar to the graph of FIG. 2, the plot of torque difference $T_d$ in FIG. 5 is discontinuous at the value $T_1$, which is the predetermined amount of torque that distinguishes the two ranges of transmitted torques. However, the slope of torque difference within the first range between 0 and $T_1$ is greater than the slope of the torque difference within the second range of transmitted torques exceeding the value of $T_1$. Although the torque difference $T_d$ and bias ratio $B(T_s)$ can be described by the same equations used to describe torque difference and bias ratio in the preceding example, the values of the proportions (i.e., coefficients) $k_1$ and $k_2$ are different.

The multi-stage torque proportioning differential 60 is particularly suitable for replacing known differentials that are preloaded for developing a high initial bias ratio that decreases with increasing torque sums to a predetermined lower bias ratio. FIG. 6 shows that the differential 60 also exhibits a high bias ratio throughout the first range of transmitted torques. However, the corresponding torque difference shown in FIG. 5 does not exceed the torque sum. In other words, the differential 60 does not develop a braking torque to oppose differential rotation between drive shafts independently of the torque transmitted to them (i.e., the torque sum). However, throughout the second range of transmitted torques, bias ratios of both the known preloaded differential and the improved differential 60 approach a limited minimum value designated at $B_2$.

Figure 7:
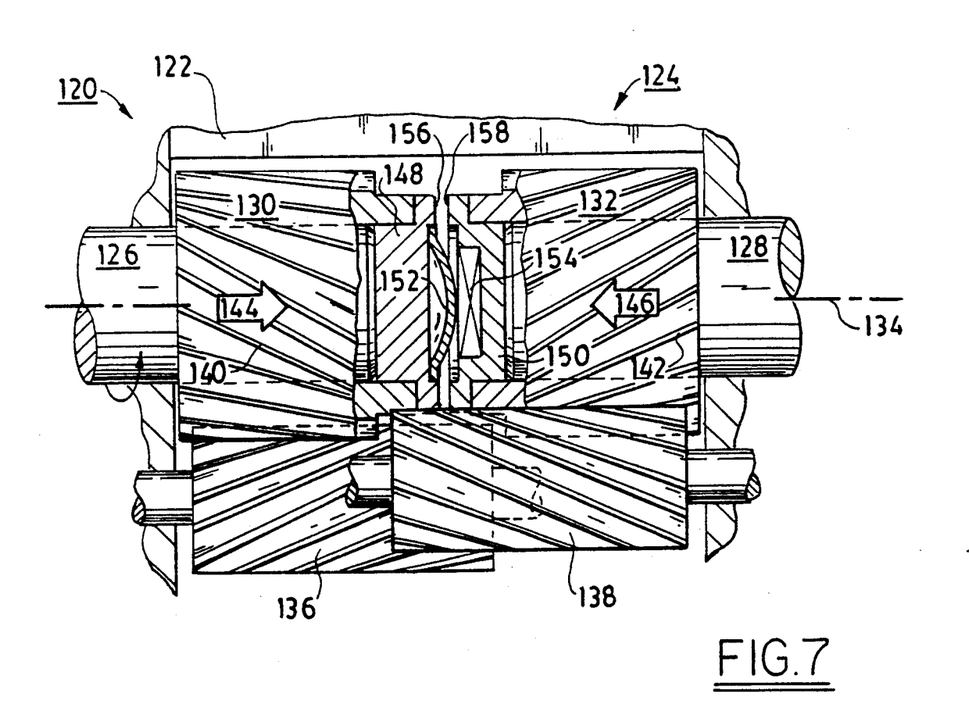
FIG. 7 is a fragmentary cross-sectional view of another helical gear differential modified in accordance with the present invention to perform similar to the modified worm gear differential.

A third example of our multi-stage torque proportioning differential is shown in FIG. 7. The differential 120 is another example of an improved helical gear differential having a housing 122 and a planetary helical gear arrangement 124 carried within the housing for interconnecting a pair of drive shafts 126 and 128. Side gears 130 and 132 are coupled to the respective drive shafts 126 and 128 for rotation about a common axis 134. Pairs of element gears 136 and 138 operatively interconnect the side gears for opposite directions of rotation with respect to the housing 122.

The side gears 130 and 132 also have respective teeth 138 and 140 that are oriented in opposite directions to the common axis 134. However, in contrast to the differential 60, the opposite hand helix angles of the side gear teeth 138 and 140 develop, in response to the transmission of forward drive torque, respective thrust forces 144 and 148 that urge the two side gears together.

Inner ends of the two side gears 130 and 132 are fitted with respective bushings 148 and 150. The bushing 148 carries a disc spring 152, and the bushing 150 carries a bearing 154 that is aligned with the disc spring 152 along the common axis 134. The bushings also include respective annular rims 156 and 158 that exhibit in contact with each other a much higher coefficient of friction than the disc spring 152 in contact with the bearing 154.

In response to the thrust forces 144 and 146 urging the respective side gears 130 and 132 together, contact is made between the disc spring 152 and bearing 154 before any contact is possible between the annular rims 156 and 158. However, the disc spring can be sufficiently compressed by a predetermined amount of drive torque to permit the annular rims 156 and 158 to make contact. The disc spring 152 and bearing 154 generate little frictional torque opposing differential rotation of the side gears throughout a first range of drive torques less than the predetermined amount. However, the annular rims 156 and 158 generate frictional torque as a significant portion of the additional drive torque throughout a second such range over the predetermined amount. The expected differential performance is similar to that illustrated by FIGS. 2 and 3.

However, in place of the disc spring 152 and bearing 154 of the embodiment shown in FIG. 7, it would be possible to mount a spherical bearing between separate disc springs that rotate with the respective side gears 130 and 132. The disc springs would engage the bearing from opposite directions about respective openings that would be sized smaller than a diameter of the bearing.

Although our invention has been described as a multi-stage differential exhibiting bias ratios that vary with torque transmissions between two values, it would also be possible to practice our invention with similar bias ratio variations between more than two values. For example, this could be accomplished by using two different strength disc springs in helical gear differential 60. It would also be possible to avoid abrupt transitions in bias ratio caused by the engagement of a second frictional surface by also supporting the second frictional surface with a spring. In addition, the thrust forces opposed by the different frictional surfaces could be generated by any one or more of the gears within the differential, as well as by other thrust generating components such as cams and couplings.

We claim:

1. A differential for use in automotive drive lines comprising:
   a housing rotatable about a pair of drive shafts;
   an operative connection between the drive shafts for permitting the drive shafts to rotate in opposite directions of rotation with respect to said housing;
   a component of said operative connection for developing a thrust force that varies in magnitude with torques transmitted between said housing and the drive shafts;
   a first frictional surface for opposing at least a portion of the magnitude of the thrust force;
   a second frictional surface for opposing a remaining portion of the thrust force magnitude; and
   a control member responsive to the transmitted torques for limiting engagement of said second frictional surface to opposing the remaining portion of the thrust force magnitude,
   wherein said first and second frictional surfaces develop frictional resistances to relative rotation between the drive shafts in different proportions to their opposed portions of the thrust force magnitude.

2. The differential of claim 1 in which the portion of the thrust force magnitude opposed by said first frictional surface is limited by the engagement of said second frictional surface.

3. The differential of claim 2 in which said control member exerts a resilient force in opposition to the thrust force developed throughout a first range of transmitted torques for supporting said second frictional surface out of engagement until said resilient force is exceeded by the thrust force developed within a second range of transmitted torques.

4. The differential of claim 3 in which said first and second frictional surfaces exhibit different coefficients of friction.

5. The differential of claim 4 in which said frictional surface exhibiting the higher of two coefficients of friction has a larger diameter at which it is effective for generating frictional torque than the other frictional surface.

6. The differential of claim 4 in which said first frictional surface exhibits a higher coefficient of friction than said second frictional surface.

7. The differential of claim 6 in which said resilient force exerted by the control member does not exceed the magnitude of the thrust force developed throughout the second range of transmitted torque.

8. A multi-stage torque proportioning differential comprising:
   a housing rotatable about a pair of drive shafts;
   gearing interconnecting the drive shafts for differential rotation with respect to said housing;
   a pair of gear-mounting surfaces within said differential for opposing a thrust force imparted by said gearing;
   one of said gear-mounting surfaces supported in a position that is offset a distance with respect to the other gear-mounting surface in a direction for opposing the thrust force; and
   a spring supporting said one gear-mounting surface for preventing said other gear-mounting surface from opposing the thrust force unless the thrust force is of sufficient magnitude to overcome a resilient force exerted by said spring required to move said one gear-mounting surface through the offset distance.

9. The differential of claim 8 in which said one and the other gear-mounting surfaces exhibit different coefficients of friction.

10. The differential of claim 9 in which said gear-mounting surface exhibiting the higher of two coefficients of friction has a larger diameter at which it is effective for generating frictional torque than the other gear-mounting surface.

11. The differential of claim 8 in which said gearing includes respective side gears coupled to the drive shafts for rotation together with the drive shafts about a common axis of rotation.

12. The differential of claim 11 in which said side gears impart respective thrust forces having a combined magnitude that is opposed by said pair of gear-mounting surfaces.

13. The differential of claim 12 in which said pair of gear-mounting surfaces is located between one of said side gears and said housing.

14. The differential of claim 12 in which said pair of gear-mounting surfaces is located between said side gears.

15. The differential of claim 11 in which said side gears impart separate thrust forces, one of the separate thrust forces is opposed by said pair of gear-mounting surfaces, and the other of the separate thrust forces is opposed by another pair of gear-mounting surfaces.

16. The differential of claim 15 in which one of said pairs of gear-mounting surfaces is located between one of said side gears and said housing, and the other of said pairs of side gears is located between the other of said side gears and said housing.

17. A differential comprising:
   a housing rotatable about a pair of drive shafts having a common axis of rotation;
   a pair of side gears carried within said housing and arranged for rotation with respective drive shafts about said common axis of rotation;
   at least one pair of element gears mounted about respective axes carried within said housing and operatively interconnecting said side gears for opposite directions of relative rotation with respect to said housing;

each of said side gears including tooth surfaces inclined to said axis common of rotation for generating respective thrust forces along said common axis having respective magnitudes proportional to drive torques transmitted between said housing and the drive shafts;

a first frictional surface associated with an end of one of said side gears for opposing a portion of the magnitude of at least one of the thrust forces;

a second frictional surface associated with said end for opposing a remaining portion of the magnitude of the one thrust force; and a resilient member for supporting said first frictional surface in a position that limits said second frictional surface to opposing the remaining portion of the magnitude of the one thrust force.

18. The differential of claim 17 in which said first and second frictional surfaces develop frictional resistances to relative rotation between the drive shafts in different proportions to their opposed portions of the magnitude of the one thrust force.

19. The differential of claim 18 in which said thrust forces have a combined magnitude that is opposed by said first and second frictional surfaces.

20. The differential of claim 18 further comprising:

a third frictional surface associated with an end of the other of said side gears for opposing a portion of the magnitude of the other of the thrust forces;

a fourth frictional surface associated with said end of the other side gear for opposing a remaining portion of the magnitude of the other thrust force; and a second resilient member for supporting said third frictional surface in a position that limits said fourth frictional surface to opposing the remaining portion of the magnitude of the other thrust force.

21. The differential of claim 20 in which said third and fourth frictional surfaces develop frictional resistances to relative rotation between the drive shafts in different proportions to their opposed portions of the magnitude of the other thrust force.

* * * * *